United States Patent
Rixon et al.

(10) Patent No.: US 6,393,934 B1
(45) Date of Patent: May 28, 2002

(54) BREAK-AWAY PEDAL WITH BALL SWIVEL SNAP-IN

(75) Inventors: Christopher Rixon, Tecumseh (CA); Steven J. Engelgau, Royal Oak, MI (US)

(73) Assignee: Teleflex Incorporated, Plymouth Meeting, PA (US)

(*) Notice: Subject to any disclaimer, the term of this patent is extended or adjusted under 35 U.S.C. 154(b) by 0 days.

(21) Appl. No.: 09/598,582

(22) Filed: Jun. 21, 2000

(51) Int. Cl.⁷ .................................................. G05G 1/14
(52) U.S. Cl. ....................................................... 74/512
(58) Field of Search ......................... 74/512, 513, 514, 74/560; 180/274, 275

(56) References Cited

U.S. PATENT DOCUMENTS

| | | | |
|---|---|---|---|
| 3,430,512 A | 3/1969 | Wossner | 74/512 |
| 3,451,288 A | 6/1969 | Barton et al. | 74/512 |
| 3,678,779 A | 7/1972 | Janosi | 74/516 |
| 4,018,104 A | 4/1977 | Bland et al. | 74/531 |
| 4,942,949 A | 7/1990 | Dai | 192/1.32 |
| 5,398,569 A | 3/1995 | Carr | 74/560 |
| 5,551,317 A | 9/1996 | Gautier et al. | 74/560 |
| 5,868,039 A | 2/1999 | Baumann | 74/512 |
| 5,921,144 A * | 7/1999 | Williams, Jr. et al. | 74/512 |
| 6,182,525 B1 * | 2/2001 | Bowers et al. | 74/512 |

FOREIGN PATENT DOCUMENTS

| | | | |
|---|---|---|---|
| DE | 195 15 852 | * | 11/1995 |
| DE | 196 17 372 | * | 1/1998 |
| WO | WO99/60457 | * | 11/1999 |

* cited by examiner

*Primary Examiner*—David A. Bucci
*Assistant Examiner*—Justin Stefanon
(74) *Attorney, Agent, or Firm*—Howard & Howard

(57) ABSTRACT

A pedal assembly (10) for use in a vehicle comprising a pedal arm (12) having a pivot (14) for movable connection to a vehicle structure (16) to allow the pedal arm (12) to pivot in a normal operating range between a rest position and a fully applied position under a predetermined normal operating load. The pedal arm (12) further includes a mechanism (18, 46) connecting the pedal arm (12) to a brake system (20) for transmitting normal operating loads through the pedal arm (12) to the brake system (20). The mechanism (18, 46) includes a fuse (22, 50) for allowing the pedal arm (12) to move independently from the brake system (20) in response to a predetermined load that exceeds the normal operating load. The pedal assembly (10) is characterized by the fuse (22, 50) being frangible for destruction in response to the predetermined load and by including a pocket member (24, 52) for supporting the fuse (22, 50) and for receiving a replacement fuse (22, 50).

9 Claims, 4 Drawing Sheets

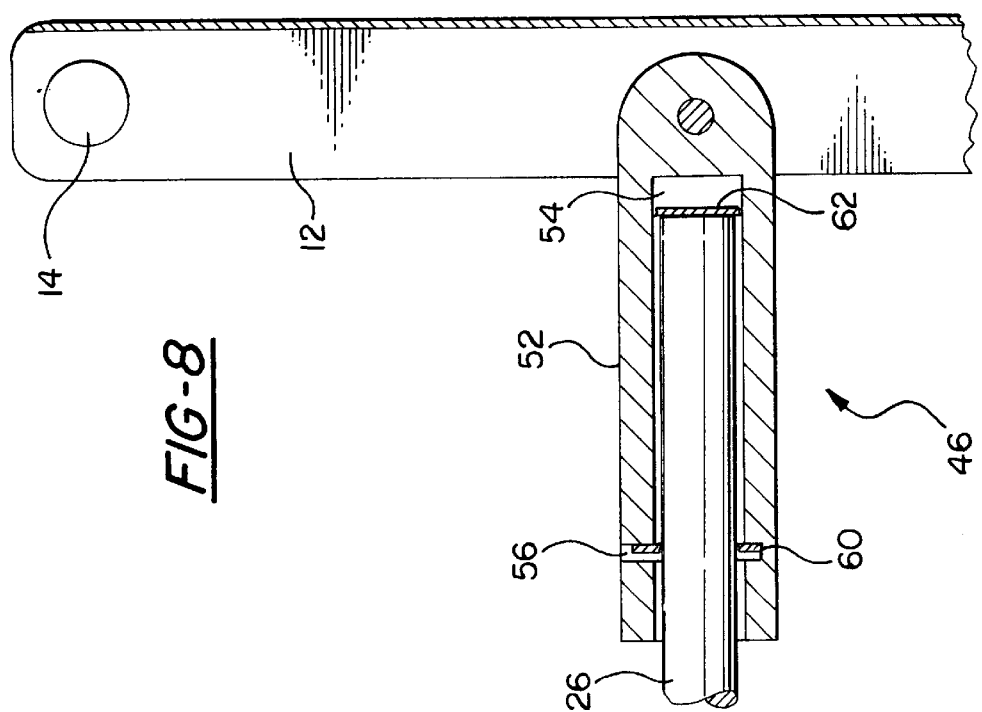
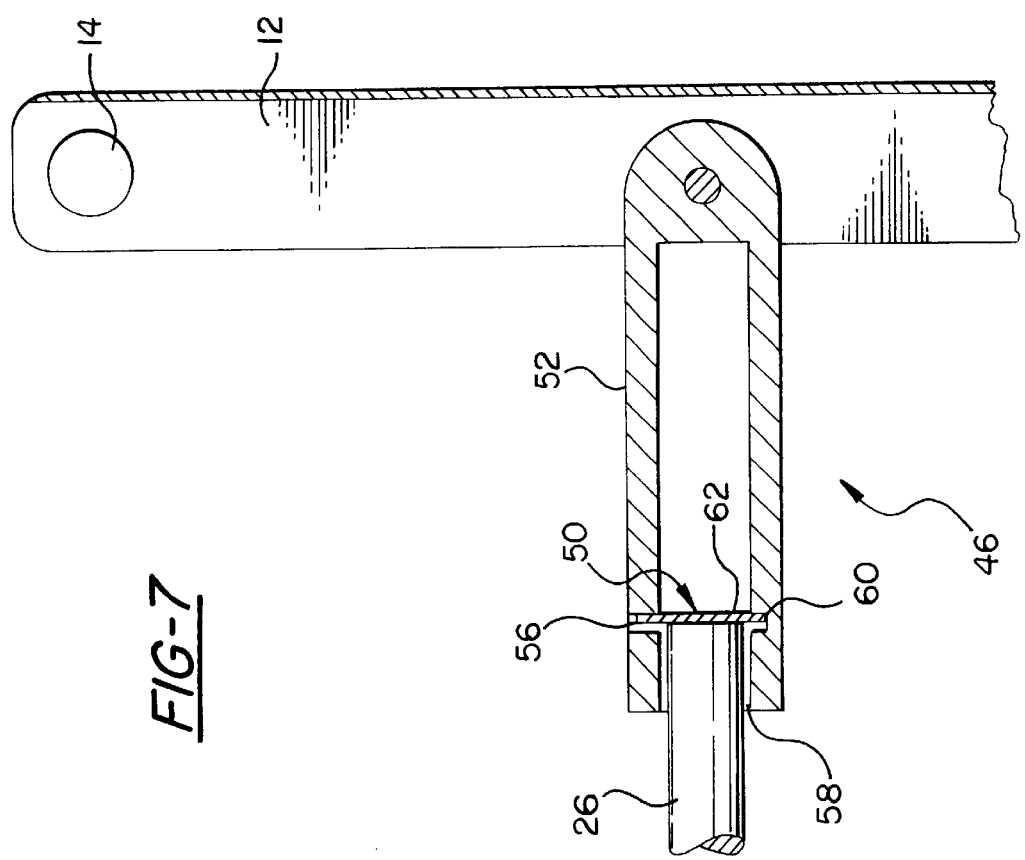

BREAK-AWAY PEDAL WITH BALL SWIVEL SNAP-IN

BACKGROUND OF THE INVENTION

1. Field of the Invention

A pedal assembly for use in a vehicle to control brakes, throttle, clutch, or the like.

2. Description of the Prior Art

Pedal assemblies are widely used in vehicles to control the brakes, throttle or clutch. Generally a pedal assembly includes a pedal arm mounted pivotally within the vehicle to allow pivotal movement between the pedal arm and the vehicle. The pivotal mounting allows the pedal arm to pivot in a normal operating range between a rest position and a fully applied position. Under normal operating loads, the pedal arm will not move beyond this normal operating range. Typically a pedal assembly of this type includes a mechanism that connects the pedal arm to a brake system. This mechanism transmits the force applied to the pedal arm by the operator to the brake system for actuating the brakes of the vehicle. Pedals can also include a fuse that creates a connection between the pedal and the brake system and which will give way and allow the pedal to move independently of the brake system if the pedal experiences a load that exceeds a predetermined maximum operating load.

Typically, this type of fuse arrangement is accomplished by incorporating a weakened section on either the pedal arm or on the connection to the brake system. When this type of fuse breaks, the pedal arm or the connection to the brake system must be replaced. Since these components are the main elements of the brake pedal assembly, they are structurally attached to the vehicle, and consequently take some time and considerable effort to replace. It is also expensive to replace the entire pedal arm or the connection to the brake system, such as a vacuum booster rod, for example.

Alternatively, fuses have been developed which do not actually break, but rather include a spring bias, which has a pre-determined spring force that will allow the pedal and the connection to the brake system to act as a unitary structure when a load within the normal operating range in applied. When a load exceeding the normal operating load is applied, the spring will compress, thereby allowing a portion of the pedal arm to flex independently of the braking system such as when the spring fuse is mounted to the pedal arm. Alternatively, the spring fuse can be mounted on the connection to the braking system, thereby allowing the connection to the brake system to collapse independently of the braking system. These fuses are relatively expensive, and add weight to the system. Although, by design, this type of fuse arrangement is not meant to be replaced, in the event of failure, the spring fuse is costly and time consuming to replace.

SUMMARY OF THE INVENTION AND ADVANTAGES

The pedal assembly of the present invention includes a pedal arm pivotally mounted to a vehicle structure allowing the pedal arm to pivot in a normal operating range between a rest position and a fully applied position under a predetermined normal operating load. The pedal assembly further includes a mechanism connecting the pedal arm to a brake system for transmitting normal operating loads from the pedal arm to the brake system. The assembly includes a fuse that allows the pedal arm to move independently from the brake system in response to a predetermined load exceeding the normal operating load. The pedal assembly of the present invention is characterized by the fuse being frangible for destruction in response to a predetermined load in excess of the normal operating load and by including a pocket member for supporting the fuse and for receiving a replacement fuse.

Consequently, the pedal assembly of the present invention includes a fuse that is compact, and can be replaced independently of the pedal arm or the connection to the braking system. The fuse can be made of a relatively cheap and lightweight material, and can be replaced very easily without having to remove or replace the main components of the pedal assembly.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 7 is a view similar to FIG. 3, but showing the alternative embodiment; and

FIG. 8 is a view similar to FIG. 4, but showing the alternative embodiment after the fuse has fractured.

DETAILED DESCRIPTION OF THE PREFERRED EMBODIMENT

Figure 1:
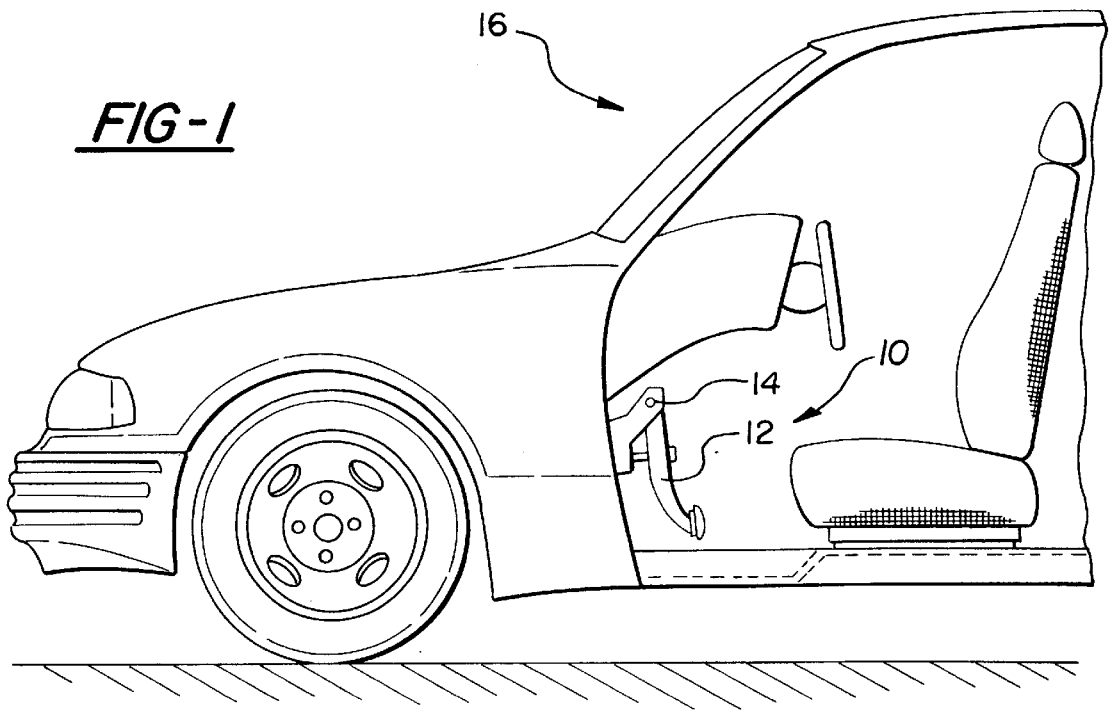
FIG. 1 is a fragmentary side view of a vehicle incorporating a pedal assembly of the present invention.

Referring to FIG. 1, a pedal assembly for use in a vehicle is shown generally at 10. The pedal assembly 10 includes a pedal arm 12 having a pivot 14 for mounting to a vehicle structure 16 to allow the pedal arm 12 to pivot in a normal operating range between a rest position and a fully applied position. Under normal operating loads, the movement of the pedal arm 12 will not extend beyond this normal operating range. The pedal arm 12 includes a foot pad (not shown) mounted on an end opposite the pivot 14. The foot pad provides a support and a target for an operator to exert force to the pedal arm 12.

Figure 2:
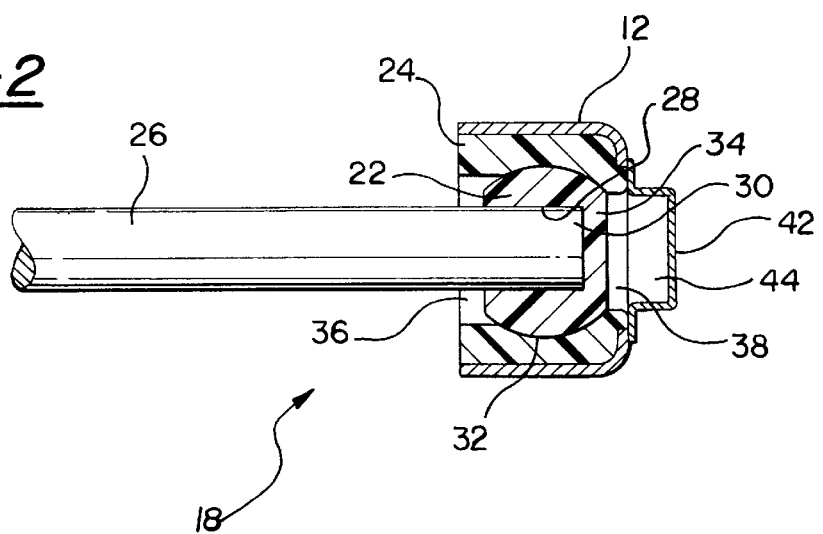
FIG. 2 is a cross sectional view taken transversely or horizontally through the pedal assembly.
Figure 3:
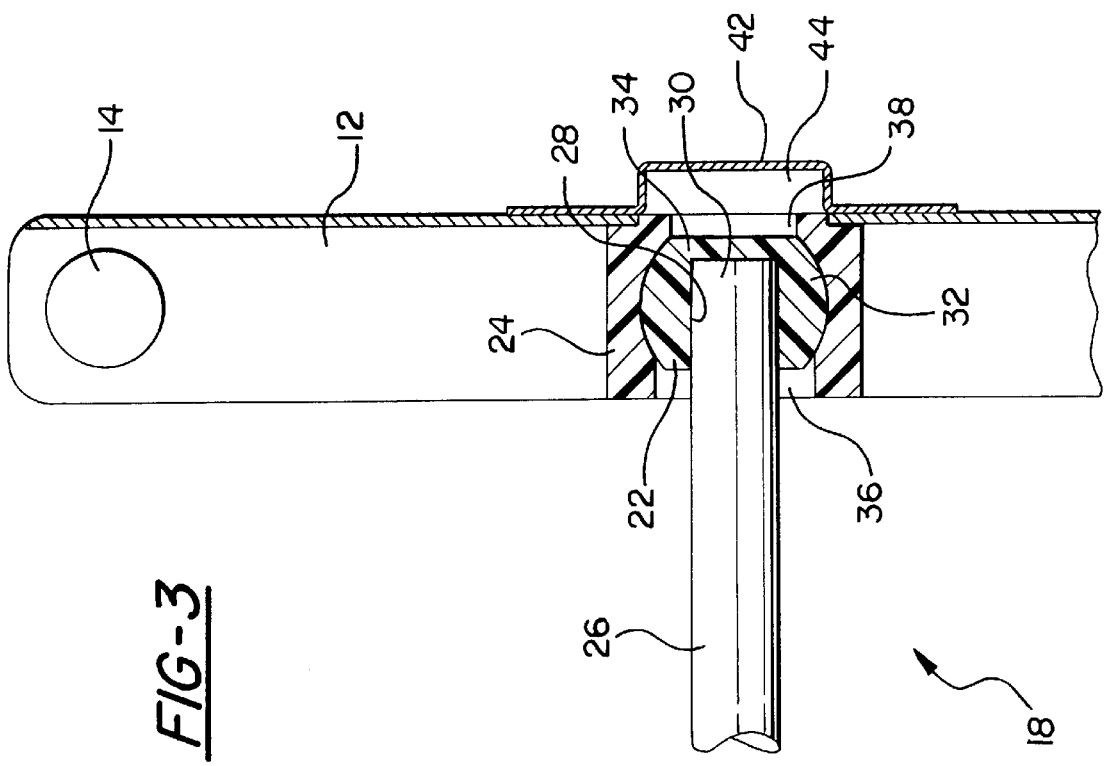
FIG. 3 is a cross sectional view taken longitudinally or vertically through the pedal assembly.

Referring to FIGS. 2 and 3, the pedal assembly 10 further includes a mechanism 18 connecting the pedal arm 12 to a brake system 20. The mechanism 18 transmits forces through the pedal arm 12 to the brake system 20 (FIG. 5) when the forces do not exceed normal operating loads. The mechanism 18 includes a fuse 22 for allowing the pedal arm 12 to move independently from the brake system 20 in response to a predetermined load in excess of the normal operating load.

The pedal assembly 10 is characterized by the fuse 22 being frangible for destruction in response to the predetermined load in excess of the normal operating load. The mechanism 18 also includes a pocket member 24 for supporting the fuse 22, wherein the pocket member 24 is also adapted for receiving a replacement fuse 22 in the event the fuse 22 has been fractured. Preferably, the pocket member 24 surrounds the fuse 22.

The mechanism 18 further includes a rod 26 for insertion into the pocket member 24. The fuse 22 further includes a cavity 28 for receiving the rod 26, such that the fuse 22 is mounted on a distal end 30 of the rod 26. The fuse 22 has a periphery 32 that is retained in the pocket member 24. The interaction of the periphery 32 and the pocket member 24 supports the fuse 22 within the pocket member 24. The fuse 22 further includes a central portion 34 that abuts the rod 26 when the rod 26 is inserted within the fuse 22. Under normal operating loads, the central portion 34 of the fuse 22 transmits forces from the pedal arm 12 to the rod 26 and thereby on to the braking system 20. The central portion 34 however, is separable from the periphery 32 in response to a load in excess of the normal operating limits.

In the preferred embodiment, the pocket member 24 is a spherical cavity and the fuse 22 is spherical in shape. The pocket member 24 is supported on the pedal arm 12 and includes an opening 36 for receiving the fuse 22. The opening 36 is slightly smaller than the diameter of the spherical fuse 22, so that when the fuse 22 is forced within the opening 36, the opening 36 must expand slightly to allow the fuse 22 into the spherical cavity 28. Once the fuse 22 is fully within the spherical cavity 28, the opening 36 will return to original dimensions, thereby preventing the spherical fuse 22 from coming out of the pocket member 24 unless enough force is exerted upon the fuse 22 to cause the opening 36 to expand.

Figure 5:
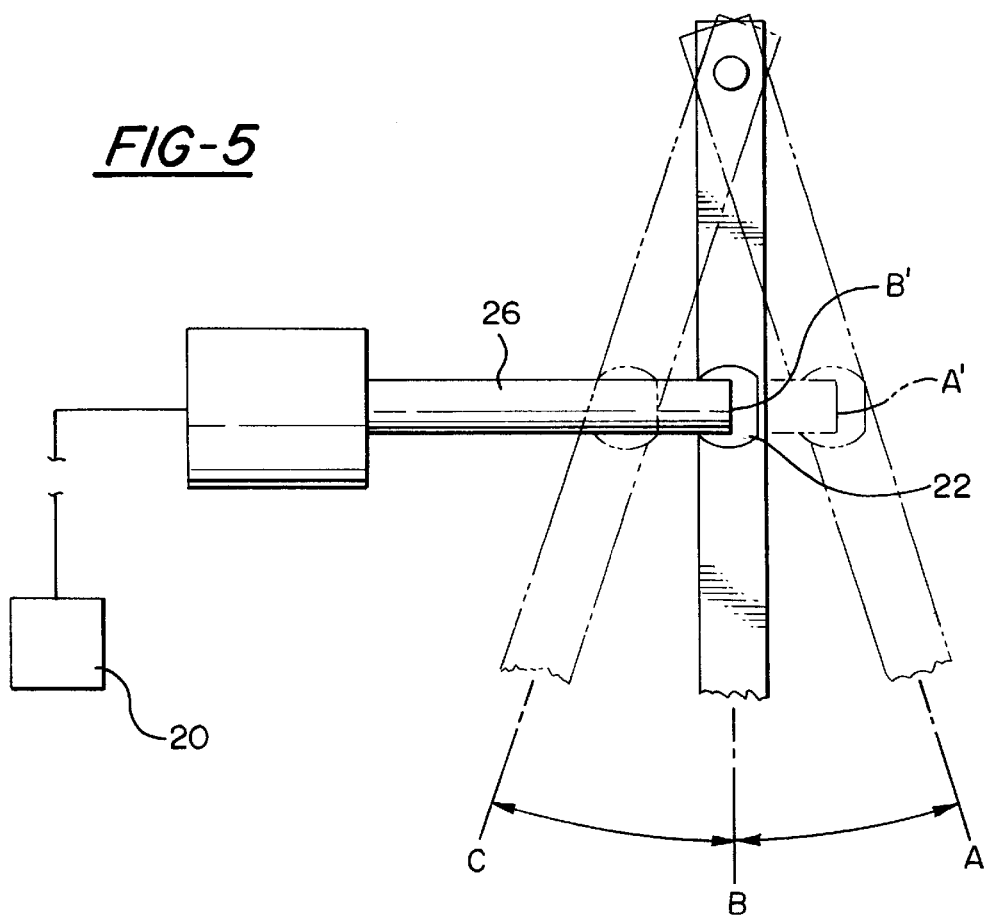
FIG. 5 is a schematic illustrating the relative movement of the pedal arm with the fuse in tact, and when the fuse is fractured.

The spherical configuration of the fuse 22 and the cavity 28 allows the rotational movement between the rod 26 and the pedal arm 12. Rotational movement is necessary as the pedal arm is moved. The pivot 14 of the pedal arm 12 is locationally fixed, as is the location of the rod 26. The pedal arm 12 moves in an arc pivoting around the pivot 14, and the rod 26 moves linearly in and out to activate the braking system 20, therefore, as the pedal arm 12 moves the angle between the pedal arm 12 and the rod 26 changes (as shown in FIG. 5). Since the fuse 22 and the pocket member 24 are spherically shaped, the fuse 22 can swivel within the pocket member 24, thereby allowing the angle between the pedal arm 12 and the rod 26 to change.

Figure 4:
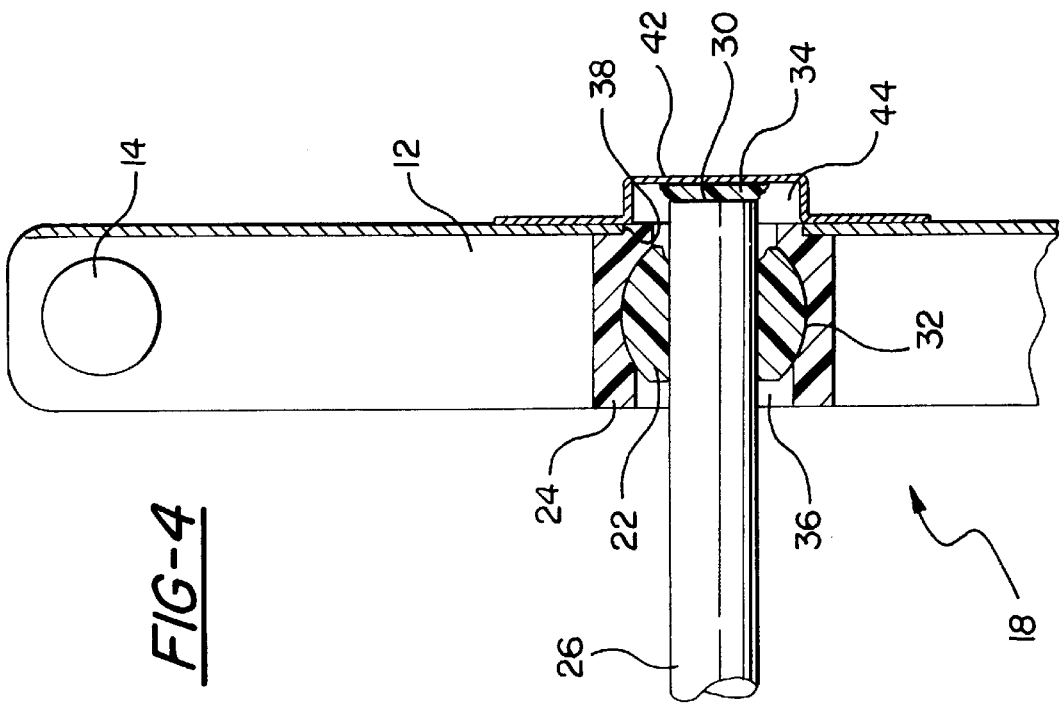
FIG. 4 is a cross sectional view taken longitudinally or vertically through the pedal assembly shown after the fuse has fractured.

Referring to FIG. 4, the pedal arm 12 includes an opening 38 on a front side 40 for allowing the rod 26 to extend through the pedal arm 12 when the fuse 22 is fractured. The pocket member 24 is supported on the pedal arm 12 directly in line with the opening 38. When a force greater than the normal operating load is applied, the fuse 22 will fracture, thereby allowing the rod 26 to extend through the fuse 22, and forward through the opening 38 in the pedal arm 12.

When the fuse 22 is fractured, and the rod 26 extends through the pedal arm 12, the connection between the braking system 20 and the pedal arm 12 is severed, thereby allowing the pedal arm 12 to swing freely of the braking system 20 and beyond the normal range of movement of the pedal arm 12. Referring to FIG. 5, when the fuse 22 is intact, and there is no force exerted upon the pedal arm 12, the pedal arm 12 extends outward to a position shown at A. The distal end 30 of the rod 26 is held within the pocket member 24 on the pedal arm 12 at a location shown by A'. When the operator of the vehicle exerts pressure upon the pedal arm 12, the pedal arm 12 moves forward. The mechanism 18 transmits motion through the pedal arm 12 to the rod 26 via the fuse 22 and pocket member 24 to actuate the rod 26, and thereby actuate the braking system 20. When the brakes are fully applied the pedal arm 12 is moved forward to a point shown by B, and the distal end 30 of the rod 26 is moved to a point shown by B'. The normal operating range of the pedal arm 12 is between the limits shown by points A and B.

When a force exceeding the design loads of the fuse 22 is exerted upon the pedal arm 12, the fuse 22 will fracture and allow the rod 26 to extend through the opening 38 within the pedal arm 12. When this happens, the pedal arm 12 is free to rotate beyond the normal operating range to a limit shown by point C. The end of the rod 26 still remains at point B', however since the fuse 22 is fractured, the rod 26 can extend through the opening 38 in the pedal arm 12, thereby allowing the pedal arm 12 to move beyond the normal operating range established by the rod 26.

Referring again to FIGS. 3 and 4, the pedal arm 12 includes a cover 42 that conceals the opening 38 within the pedal arm 12 until the fuse 22 is fractured. The cover 42 is not structurally suitable to support the rod 26. If the fuse 22 is fractured and the rod 26 extends through the opening 38 within the pedal arm 12, the rod 26 will punch through the cover 42 to allow the pedal arm 12 to move freely with respect to the braking system 20. The cover 42 includes a cavity chamber, or open space, 44 for receiving the rod 26 such that if the pedal arm 12 is not moved too far beyond the normal operating range the rod 26 may not break through the cover 42, thereby keeping the distal end 30 of the rod 26 concealed.

In the event that the fuse 22 is fractured, a new fuse 22 can be placed onto the rod 26 and snapped within the pocket member 24 to repair the mechanism 18 and return the pedal assembly 10 to normal operating condition.

The fuse 22 and pocket member 24 are made from materials suitable based upon the operating limits of the pedal assembly 10. It is desired that the fuse 22 act as the weak link in the system, therefore, the fuse 22 should be made from a material that will fracture under load before the other components of the system. Additionally, the fuse 22 must be robust enough to withstand forces that will be ordinarily experience by the pedal arm 12. In the preferred embodiment, the fuse 22 is formed of a powdered metal or ceramic, and the pocket member 24 is formed must be rigid enough to secure the fuse 22 therein, but flexible enough to allow the fuse 22 to be snapped within. Ultimately, the materials will be determined by the operating parameters of the system and the requirements for the particular application.

Figure 6:
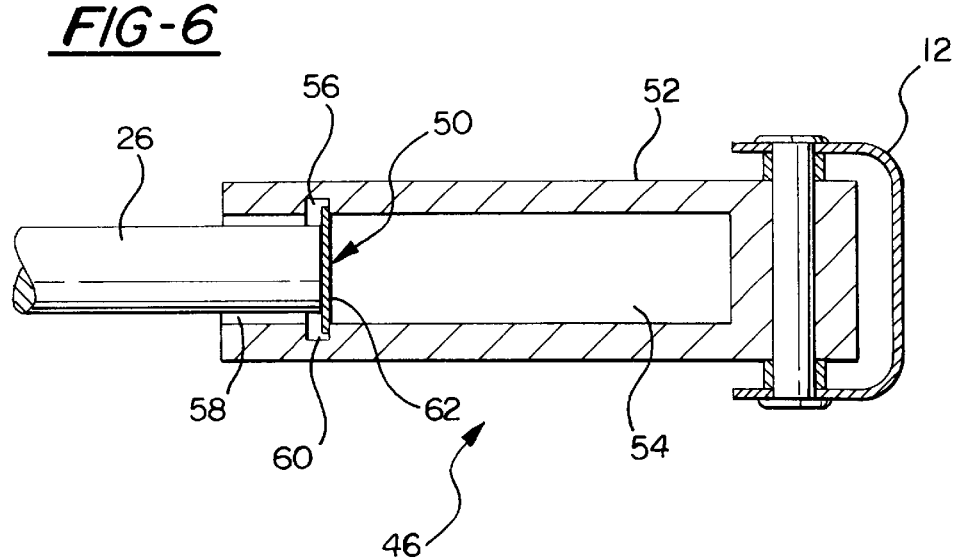
FIG. 6 is a view similar to FIG. 2, but showing an alternative embodiment of the pedal assembly of the present invention.

Referring to FIGS. 6 and 7, an alternative embodiment of the mechanism is shown at 46. The alternative mechanism 46 also reacts to the pedal arm 12 having a pivot 14 for mounting to a vehicle structure 16 to allow the pedal arm 12 to pivot in a normal operating range between a rest position and a fully applied position. Under normal operating loads, the movement of the pedal arm 12 will not exceed beyond this normal operating range. The pedal arm 12 includes a foot pad (not shown) mounted on an end opposite the pivot 14. The foot pad provides a support and a target for an operator to exert force to the pedal arm 12.

The alternative mechanism 46 also connects the pedal arm 12 to a brake system 20. The mechanism 46 transmits forces through the pedal arm 12 to the brake system 20 when the forces do not exceed normal operating loads. The mechanism 46 includes a fuse 50 for allowing the pedal arm 12 to move independently from the brake system 20 in response to a predetermined load in excess of the normal operating load.

The alternative mechanism 46 is characterized by the fuse 50 being frangible for destruction in response to the predetermined load in excess of the normal operating load. The mechanism 46 also includes a pocket member 52 for supporting the fuse 50, wherein the pocket member 52 is also adapted for receiving a replacement fuse 50 in the event the fuse 50 has been fractured. Preferably, the pocket member 52 surrounds the fuse 50.

The pocket member 52 is pivotally mounted to the pedal arm 12 and is generally cylindrical in shape. The pocket member 52 further includes an inner cavity chamber, or open space 54 with a slot 56 formed for supporting the fuse 50 within the inner cavity 54. The inner cavity 54 includes an opening 58 for receiving the rod 26. The slot 56 is formed within the pocket member 52 at a point near the opening 58 such that when the rod 26 is inserted within the inner cavity 54 the rod 26 will abut the fuse 50 preventing the rod 26 from extending further within the inner cavity 54.

In the alternative embodiment, the fuse 50 is disk shaped and is received within the slot 56 formed on the pocket member 52. The fuse 50 includes a periphery 60 and a central portion 62. The slot 56 supports the periphery 60 of the fuse 50, and the rod 26 abuts a central portion 62 of the fuse 50. When a load exceeding the normal operating load in exerted on the pedal arm 12, the central portion 62 of the fuse 50 fractures to allow the rod 26 to extend through the fuse 50 and further into the inner cavity 54 of the pocket member 52. Once the rod 26 is free to extend within the inner cavity 54, the connection between the pedal arm 12 and the braking system 20 is severed, thereby allowing the pedal arm 12 to pivot beyond the normal operating range.

In the event that the fuse 50 is fractured, a new fuse 50 can be placed within the slot 56 on the pocket member 52 to repair the mechanism 46, and return the alternative mechanism 46 to normal operating condition.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A pedal assembly (10) for use in a vehicle comprising:

a pedal arm (12) having a pivot (14) for movable connection to a vehicle structure (16) to allow said pedal arm (12) to pivot in a normal operating range between a rest position and a fully applied position under a predetermined normal operating load; and a mechanism (18, 46) connecting said pedal arm (12) to a brake system (20) for transmitting normal operating loads therebetween;

said mechanism comprising a fuse (22, 50) for allowing said pedal arm (12) to move independently from the brake system (20) in response to a predetermined load, said fuse (22, 50) being frangible for destruction in response to said predetermined load and a pocket member (24, 52) supporting said fuse (22, 50) and for receiving a replacement fuse (22), said fuse (22, 50) including a central portion (34, 62), said pocket member (24, 52) presenting an open space (44, 54) adjacent said central portion (34, 62) of said fuse (22, 50), a rod (26) for insertion into said pocket member (24, 52) for abutting said central portion (34, 62) for transmitting said normal operating loads through said pocket member (24, 52) and for breaking said fuse (22, 50) to separate and move said central portion (34, 62) into said open space (44, 54).

2. An assembly as set forth in claim 1 wherein said pocket member (24, 52) surrounds said fuse (22, 50).

3. An assembly as set forth in claim 2 wherein said pocket member (24) is spherical and said fuse (22) is spherical and supported for swiveling movement within said pocket member (24).

4. An assembly as set forth in claim 3 wherein said spherical fuse (22) includes a cavity (28) and said rod (26) is disposed in said cavity (28).

5. A pedal assembly (10) for use in a vehicle comprising:

a pedal arm (12) having a pivot (14) for movable connection to a vehicle structure (16) to allow said pedal arm (12) to pivot in a normal operating range between a rest position and a fully applied position under a predetermined normal operating load; and a mechanism (18, 46) connecting said pedal arm (12) to a brake system (20) for transmitting normal operating loads therebetween;

a fuse (22, 50) for allowing said pedal arm (12) to move independently from the brake system (20) in response to a predetermined load, said fuse (22, 50) being frangible for destruction in response to said predetermined load and a pocket member (24, 52) supporting said fuse (22, 50) and for receiving a replacement fuse (22) said pocket member (24) is supported on said pedal arm (12).

6. An assembly as set forth in claim 5 wherein said pedal arm (12) includes an opening (38) for allowing said rod (26) to extend therethrough.

7. An assembly as set forth in claim 6 wherein said pedal arm (12) includes a cover (42) mounted over said opening (38), said cover (42) including an open space (44) for receiving said rod (26).

8. An assembly as set forth in claim 2 wherein said fuse (50) is disk shaped.

9. An assembly as set forth in claim 8 wherein said pocket member (52) is pivotally mounted to said pedal arm (12) and includes said open space (54) for receiving said rod (26) and a slot (56) for receiving said fuse (22).

* * * * *